(12) United States Patent
Stapleton et al.

(10) Patent No.: US 12,438,707 B2
(45) Date of Patent: Oct. 7, 2025

(54) PUBLIC KEY INFRASTRUCTURE USING QUANTUM COMPUTERS (PKIQC)

(71) Applicant: Wells Fargo Bank, N.A., San Francisco, CA (US)

(72) Inventors: Jeffrey J. Stapleton, O'Fallon, MO (US); Richard Orlando Toohey, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 125 days.

(21) Appl. No.: 18/531,600

(22) Filed: Dec. 6, 2023

(65) Prior Publication Data
US 2025/0192995 A1 Jun. 12, 2025

(51) Int. Cl.
  *H04L 9/08* (2006.01)
  *H04L 9/32* (2006.01)

(52) U.S. Cl.
  CPC .......... *H04L 9/0852* (2013.01); *H04L 9/0877* (2013.01); *H04L 9/321* (2013.01)

(58) Field of Classification Search
  CPC ...... H04L 9/0852; H04L 9/0877; H04L 9/321
  USPC .......................................................... 713/168
  See application file for complete search history.

(56) References Cited

U.S. PATENT DOCUMENTS

| | | | |
|---|---|---|---|
| 10,972,272 B2 * | 4/2021 | Yu .......................... | H04L 9/3265 |
| 11,552,803 B1 * | 1/2023 | Simkhada ............... | G06F 21/73 |
| 11,716,206 B2 * | 8/2023 | Gray ...................... | H04L 63/166 |
| | | | 713/156 |
| 12,143,818 B2 * | 11/2024 | Lee ........................ | H04W 12/50 |
| 2022/0173915 A1 * | 6/2022 | Gray ...................... | H04L 9/0852 |
| 2023/0104332 A1 * | 4/2023 | Lambert ............... | G06F 3/0604 |
| | | | 713/157 |
| 2024/0179014 A1 * | 5/2024 | Ruan ..................... | H04L 9/3265 |
| 2024/0372850 A1 * | 11/2024 | Kim ..................... | H04L 63/0823 |

* cited by examiner

*Primary Examiner* — Dereena T Cattungal
(74) *Attorney, Agent, or Firm* — Foley & Lardner LLP

(57) ABSTRACT

The present disclosure is directed to systems, methods, and non-transitory computer-readable media for generating a first signature on a first certificate of the plurality of certificates using a first digital signature generation algorithm based on a first private key. The first signature is validated by a relying party device using a first public key in certificate chain validation. The first public key and the first private key form a first public/private key pair. A second signature is generated on a second certificate of the plurality of certificates using a second digital signature generation algorithm based on a second private key. The second signature is validated by the relying party device using a second public key in the certificate chain validation. The second public key and the second private key form a second public/private key pair. The relying party device uses a third public key in the second certificate to verify a third signature on signed data. The relying party device includes a classical computer having at least one processor that processes bits.

17 Claims, 3 Drawing Sheets

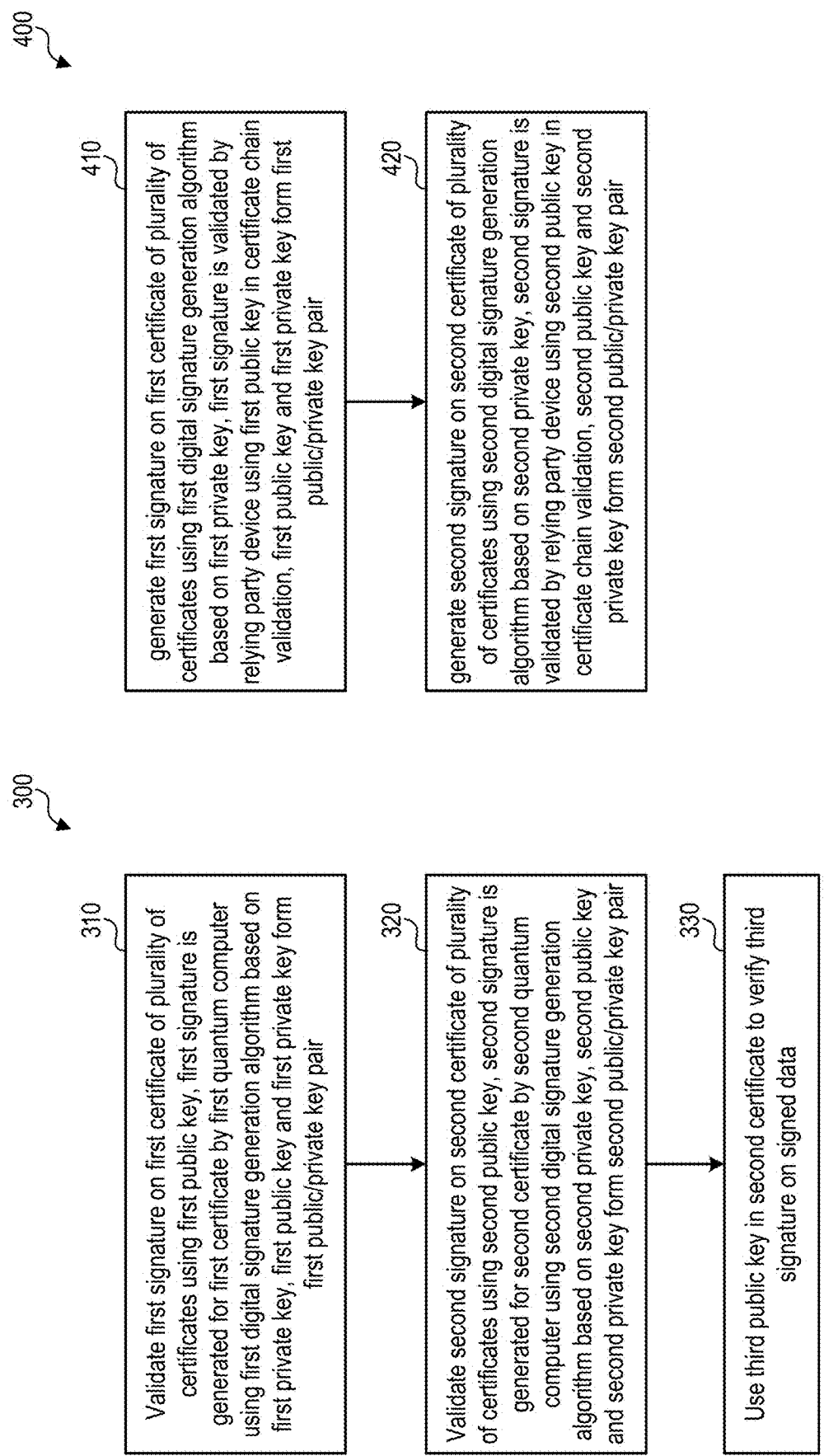

PUBLIC KEY INFRASTRUCTURE USING QUANTUM COMPUTERS (PKIQC)

BACKGROUND

In a Public Key Infrastructure (PKI), a Certificate Authority (CA) can issue a certificate (e.g., a digital certificate, a public key certificate, and so on) having a subject associated with a subject public key. In other words, in a PKI, a CA issues a signed certificate associating a subject with a public key. The CA's signature on the certificate binds the CA's name, the subject's name, and the subject's public key together, along with other certificate information. A relying party obtains the certificate of the subject and obtains from the certificate the issuing entity (e.g., the CA), the subject, and the subject public key. The relying party also obtains one or more CA certificates to obtain one or more public keys of the PKI in order to validate the certificate chain and verify the certificate of the subject. Upon establishing trust in the certificate via certificate validation (e.g., the relying party validating the trust in the subject certificate and the CA certificate), the subject and the relying party can establish other cryptographic keys, exchange or communicate encrypted data, signed messages, digital signatures, and so on.

SUMMARY

The arrangements disclosed herein relate to systems, methods, and non-transitory computer-readable media for performing certificate chain validation including validating a plurality of certificates. Performing the certificate chain validation includes validating a first signature on a first certificate of the plurality of certificates using a first public key, the first signature is generated for the first certificate by a first quantum computer using a first digital signature generation algorithm based on a first private key, the first public key and the first private key form a first public/private key pair, and validating a second signature on a second certificate of the plurality of certificates using a second public key, the second signature is generated for the second certificate by a second quantum computer using a second digital signature generation algorithm based on a second private key, the second public key and the second private key form a second public/private key pair. In response to successfully completing the certificate chain validation, a third public key is used in the second certificate to verify a third signature on signed data. The first quantum computer and the second quantum computer processes quantum bits or qubits.

The arrangements disclosed herein relate to systems, methods, and non-transitory computer-readable media for generating a first signature on a first certificate of the plurality of certificates using a first digital signature generation algorithm based on a first private key. The first signature is validated by a relying party device using a first public key in certificate chain validation. The first public key and the first private key form a first public/private key pair. A second signature is generated on a second certificate of the plurality of certificates using a second digital signature generation algorithm based on a second private key. The second signature is validated by the relying party device using a second public key in the certificate chain validation. The second public key and the second private key form a second public/private key pair. The relying party device uses a third public key in the second certificate to verify a third signature on signed data. The relying party device includes a classical computer having at least one processor that processes bits.

These and other features, together with the organization and manner of operation thereof, will become apparent from the following detailed description when taken in conjunction with the accompanying drawings.

BRIEF DESCRIPTION OF THE DRAWINGS

FIG. 3 is a schematic diagram illustrating an example method for PKIQC certificate chain validation, according to various arrangements.

FIG. 4 is a schematic diagram illustrating an example method for managing a PKIQC certificate chain, according to various arrangements.

DETAILED DESCRIPTION

Figure 1:
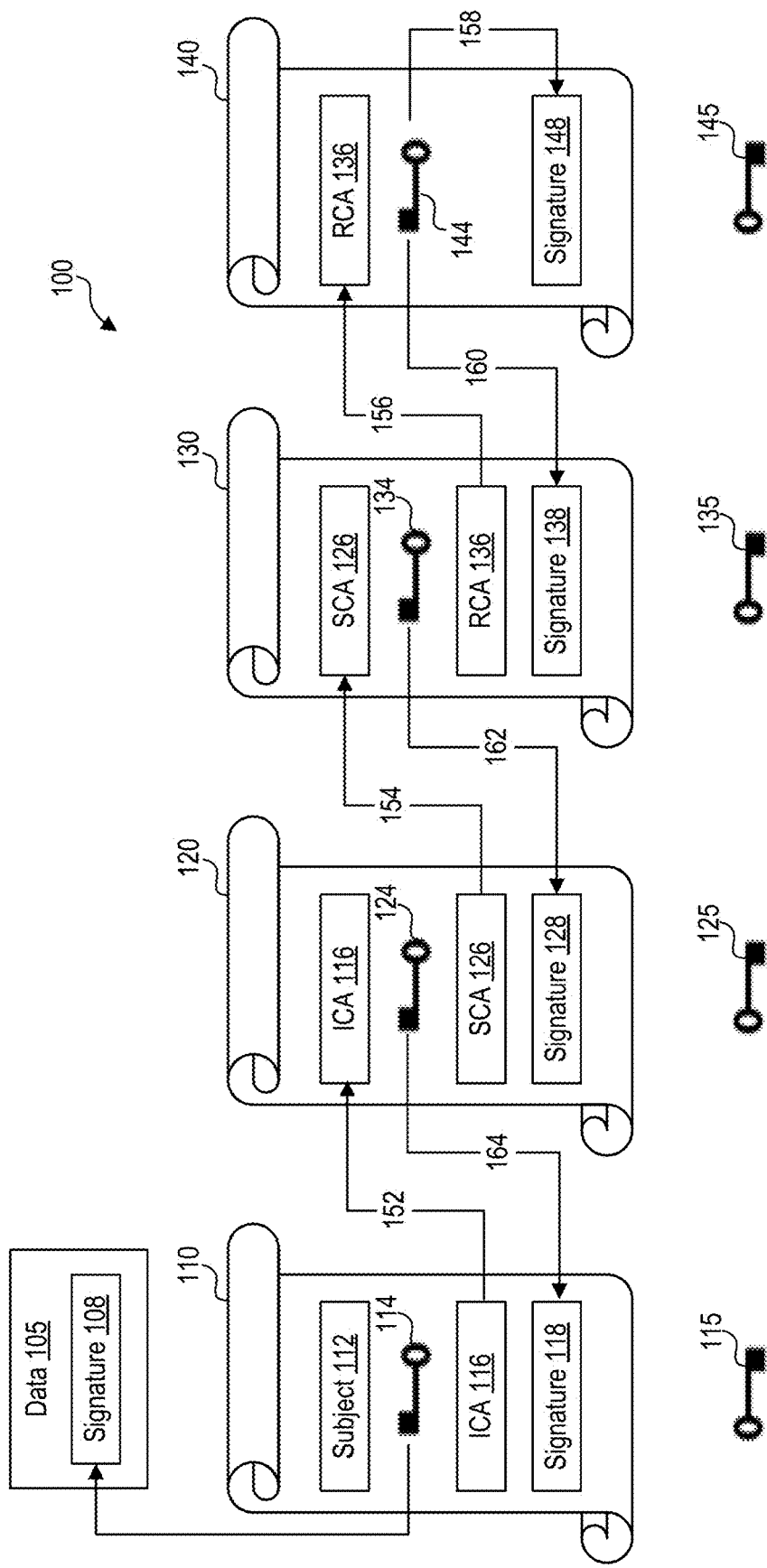
FIG. 1 is a schematic diagram illustrating an example method for PKIQC certificate chain validation, according to various arrangements.

Telecommunication standards such as the Telecommunication Standardization Sector (ITU-T) X.509 Recommendation defines several types of certificates including an End-Entity (EE) certificate, also referred to as a public key certificate, which is issued to an entity (e.g., an end entity or an end entity device) by a CA or an Attribute Authority (AA). The CA or AA signs the EE certificate using its private signature key such that any relying party or relying party device can verify the EE certificate signature using the CA or AA public key, which is contained in a CA certificate or an AA certificate.

In some examples, an AA certificate is an attribute certificate for one AA issued by another AA or by the same AA. In some examples, an attribute certificate includes a data structure that is digitally signed by an AA that binds some attribute values with identification information about its holder. In some examples, a CA certificate is a public-key certificate for one CA issued by another CA or by the same CA. In some examples, a public key certificate contains the public key of an entity (e.g., the end entity or end entity device), together with some other information, rendered unforgeable by digital signature with the private key of the CA that issued the public key certificate.

In some examples, a self-issued certificate is a certificate of a CA. The issuer and the subject of the are the self-issued certificate are the same CA. A CA can use self-issued certificates, for example, during a key rollover operation to provide trust from the old key to the new key. In some examples, a self-signed certificate is a type of self-issued certificates. The private key used by the CA to sign the CA certificate corresponds to the public key that is certified within the CA certificate. A CA can use a self-signed certificate, for example, to advertise the public key of the CA or other information about the operations of the CA.

In some arrangements, in the PKI X.509 scheme or PKIX, a certification chain includes an EE certificate, an Issuing CA (ICA) certificate, one or more Subordinate CA (SCA) certificates, and a Root CA (RCA) certificate. The EE certificate signature is verified using the ICA certificate. The ICA certificate signature is verified using the SCA certificate. The SCA certificate signature is verified using the RCA certificate. The RCA certificate signature is verified using the RCA certificate. The relationships between the EE, ICA, SCA, and RCA are referred to as the certificate chain which the relying party validates (e.g., via certificate validation) to confirm the validity of the certificates.

The ICA, SCA, and RCA are components of a PKI operated by either a public or private CAs. Each CA private signature key is secured in or using a Hardware Security Module (HSM). The end entity device can use an HSM or a cryptographic software module, depending on the end entity device's risk and the CA's stipulations declared in its Certificate Practice Statement (CPS) or its Subscriber Agreement (SA). The CPS and SA are industry recognized agreement that impose contractual obligations between the CA and the EE.

The arrangements described herein relate to systems, apparatuses, methods, and non-transitory computer-readable media for Public Key Infrastructure using Quantum Computers (PKIQC), in which certificates (e.g., X.509 certificates) are signed with digital signature algorithms that run signature generation on Quantum Computers (QCs). Accordingly, the private keys of the CA are used only with the digital signature generation algorithms that run signature generation on QCs. Consequently, no other entity, legitimate or otherwise, can run the digital signature algorithm without access to the private key and specialized hardware (e.g., a QC) and therefore cannot generate a PKIQC certificate. Subsequently, any relying party can validate the PKIQC certificate with the digital signature algorithm that runs signature verification on a classical computer. For example, only the CA public keys are used with the digital signature verification algorithm on a classical computer. The arrangements described herein improve the validity of PKIQC certificates, increase the overall security of the PKI, and reduce the potential of a counterfeit certificate. The relying party has a higher assurance level that the certificates are trustworthy. Security of PKIs can accordingly be improved.

A PKI hierarchy includes nodes and the corresponding Registration Authority (RA). Each of the nodes in the PKI hierarchy can include or represents a CA such as a RCA, an intermediary CA or SCA, or ICA. That is, a PKI has a hierarchy including one or more Cas. For example an ICA signs a certificate of the end entity device using a private key of the ICA. An SCA signs a certificate of the ICA using a private key of the SCA. The RCA signs a certificate of the SCA and its own RCA certificate using a private key of the RCA. The RCA, SCA, and ICA certificates are typically downloaded by the relying party device and stored in a trusted environment for later use.

FIG. 1 is a schematic diagram illustrating an example method 100 for PKIQC certificate chain validation, according to various arrangements. FIG. 1 shows a certificate chain including a subject certificate 110, an ICA certificate 120, an SCA certificate 130, and an RCA certificate 140. While the SCA certificate 130 is shown in FIG. 1, other examples may not be implemented with any SCA certificate. The subject certificate 110 is validated through certificate chain validation method 100. The subject certificate 110 is also referred to as an EE certificate. In some arrangements, the ICA issues the subject certificate 110, and the RCA issues the ICA certificate 120, the SCA certificate 130, and the RCA certificate 140. In some examples, issuing a certificate means a CA signs the certificate with its private key.

A relying party device can obtain (e.g., receive) the subject certificate 110 from a subject. For example, a relying party device can receive signed data (e.g., a signed message, signed code, signed document, signed file, signed program or application, and so on) and the subject certificate 110. The data is signed by the end entity device using a private key of the end entity device. The relying party device can also obtain the subject certificate 110 (e.g., the EE certificate of the end entity device) from the end entity device with the signed data. The relying party device validates the certificate chain of the subject certificate 110 using the public key of the associated CA along with other certificate parameters (e.g., validity dates, key usage, etc.) and then uses the public key 114 of the end entity device to verify the signature 108 in the signed data 105.

For example, in response to receiving the signed data and the subject certificate 110 of the end entity device, the relying party device confirms the parameters of the subject certificate 110 and determines or otherwise identifies the ICA certificate 120, at 152. In some examples, revocation services, such as Certificate Revocation List (CRL) and Online Certificate Status Protocol (OCSP) can be used to determine whether a certificate is revoked. In response to determining that the certificate is not revoked, the certificate can be relied upon. On the other hand, in response to determining that the certificate is revoked, the certificate validation fails and the certificate cannot be relied upon.

In some arrangements, the subject certificate 110 of the end entity or the end entity device includes information such as a subject 112, a public key 114, ICA information 116 identifying an ICA, and a signature 118 of the ICA. The subject 112 identifies origin of the certificate 110, such as the end entity or the end entity device, or the device from which the signed data originates. Examples of the subject 112 includes a name of an individual, company, organization, device, an application, or so on associated with the end entity or the end entity device. The subject certificate 110 can be parsed to determine the ICA information 116. In some examples, the ICA information 116 includes identifying information of the ICA, such as an ICA name, an ICA index, an ICA identifier, an ICA number, a link (e.g., a Uniform Resource Locator (URL), a Uniform Resource Name (URN), or Uniform Resource Identifier (URI)) to the ICA or the ICA certificate 120.

The subject certificate 110 (e.g., the key usage field and extended key usage field) includes other information such as validity dates, key usage, and so on. In response to obtaining the subject certificate 110, such information can be parsed by the relying party device and confirmed or verified. For example, the relying party device can verify the validity dates against a current date to determine whether the subject certificate 110 is currently valid. The relying party device can verify the usage designed in the subject certificate 110 against the present usage (e.g., to verify the signature on the signed data). This is referred to as confirming the parameters of the subject certificate 110. In some examples, in response to confirming the parameters of the subject certificate 110, the relying party device can determines or otherwise identifies the ICA certificate 120 according to the ICA information 116, at 152. For example, the relying party device can access or find the ICA certificate 120 using the identifying information of the ICA certificate 120 or the ICA in the ICA information 116.

In response to accessing or finding the ICA certificate 120, the relying party device confirms the parameters of the ICA certificate 120 and determines or otherwise identifies the SCA certificate 130, at 154.

In some arrangements, the ICA certificate 120 includes information such as the ICA information 116, a public key 124, SCA information 126 identifying an SCA, and a signature 128 of the SCA. The ICA certificate 120 can be parsed to determine the SCA information 126. In some examples, the SCA information 126 includes identifying information of the SCA, such as an SCA name, an SCA index, an SCA identifier, an SCA number, a link (e.g., a URL, a URN, or URI) to the SCA or the SCA certificate 130.

The ICA certificate 120 (e.g., the key usage field and extended key usage field) includes other information such as validity dates, key usage, and so on. In response to obtaining the ICA certificate 120, such information can be parsed by the relying party device and confirmed or verified. For example, the relying party device can verify the validity dates against a current date to determine whether the ICA certificate 120 is currently valid. The relying party device can verify the usage designed in the ICA certificate 120 against the present usage (e.g., to verify the signature on the signed data or certificate chain validation). This is referred to as confirming the parameters of the ICA certificate 120. In some examples, in response to confirming the parameters of the ICA certificate 120, the relying party device can determines or otherwise identifies the SCA certificate 130 according to the SCA information 126, at 154. For example, the relying party device can access the SCA certificate 130 using the identifying information of the SCA certificate 130 or the SCA in the SCA information 126.

In response to accessing or finding the SCA certificate 130, the relying party device confirms the parameters of the SCA certificate 130 and determines or otherwise identifies the RCA certificate 140, at 156.

In some arrangements, the SCA certificate 130 includes information such as the SCA information 126, a public key 134, RCA information 136 identifying an RCA, and a signature 138 of the RCA. The SCA certificate 130 can be parsed to determine the RCA information 136. In some examples, the RCA information 136 includes identifying information of the RCA, such as an RCA name, an RCA index, an RCA identifier, an RCA number, a link (e.g., a URL, a URN, or URI) to the RCA or the RCA certificate 140.

The SCA certificate 130 (e.g., the key usage field and extended key usage field) includes other information such as validity dates, key usage, and so on. In response to obtaining the SCA certificate 130, such information can be parsed by the relying party device and confirmed or verified. For example, the relying party device can verify the validity dates against a current date to determine whether the SCA certificate 130 is currently valid. The relying party device can verify the usage designed in the SCA certificate 130 against the present usage (e.g., to verify the signature on the signed data or certificate chain validation). This is referred to as confirming the parameters of the SCA certificate 130. In some examples, in response to confirming the parameters of the SCA certificate 130, the relying party device can determines or otherwise identifies the RCA certificate 140 according to the RCA information 136, at 156. For example, the relying party device can access the RCA certificate 140 using the identifying information of the RCA certificate 140 or the RCA in the RCA information 136.

In response to accessing or finding the RCA certificate 140, the relying party device confirms the parameters of the RCA certificate 140. The RCA certificate 140 (e.g., the key usage field and extended key usage field) includes other information such as validity dates, key usage, and so on. In response to obtaining the RCA certificate 140, such information can be parsed by the relying party device and confirmed or verified. For example, the relying party device can verify the validity dates against a current date to determine whether the RCA certificate 140 is currently valid. The relying party device can verify the usage designed in the RCA certificate 140 against the present usage (e.g., to verify the signature on the signed data or certificate chain validation). This is referred to as confirming the parameters of the RCA certificate 140. In some examples, in response to confirming the parameters of the RCA certificate 140, the relying party device can validate the certificates 140, 130, 120 and 110.

In some arrangements, the RCA certificate 140 includes information such as a public key 144. The RCA certificate 140 includes a signature 148 of the RCA. The relying party can use the public key 144 of the RCA to verify the signature 148 in the RCA certificate 140, at 158. At 160, the relying party device can use the public key 144 of the RCA to verify the signature 138 in the SCA certificate 130. At 162, the relying party device can use the public key 134 of the SCA to verify the signature 128 in the ICA certificate 120. At 164, the relying party device can use the public key 124 of the ICA to verify the signature 118 in the subject certificate 110.

Upon successfully completing certificate chain validation, the relying party device can use the subject public key 114 per its key usage, including verifying a digital signature on the signed data. In some examples, the relying party device can use the subject public key 114 in other operations such as establishing a symmetric key, decrypting ciphertext, and so on. In response to determining that certificate chain validation has failed, the relying party device stops trusting the subject certificate.

In some examples, a private key 115 is mathematically related to the public key 114, e.g., the private key 115 and the public key 114 form a public/private key pair. Asymmetric private and public keys are mathematically related, unlike symmetric keys. Although asymmetric private and public keys are not random numbers, random numbers and random prime numbers are used in generating the private and public keys. The end entity device can use the private key 115 to sign the signed data. In some examples, the end entity device secures the private key 115 in an HSM or a cryptographic software module. In some examples, the end entity device includes a classical computer. In some examples, the HSM in which the private key 115 is stored includes a classical computer. In some examples, the cryptographic software module in which the private key 115 is running on a classical computer.

In some examples, a private key 125 is mathematically related to the public key 124, e.g., the private key 125 and the public key 124 form a public/private key pair. Only a quantum computer can sign the certificate 110 (e.g., generate the signature 118) via a digital signature generation algorithm using the private key 125. The relying party device, which includes a classical computer, can use the public key 124 to verify the signature 118.

In some examples, a private key 135 is mathematically related to the public key 134, e.g., the private key 135 and the public key 134 form a public/private key pair. Only a quantum computer can sign the certificate 120 (e.g., generate the signature 138) via a digital signature generation algorithm using the private key 135. The relying party device, which includes a classical computer, can use the public key 134 to verify the signature 128.

In some examples, a private key 145 is mathematically related to the public key 144, e.g., the private key 145 and the public key 144 form a public/private key pair. Only a quantum computer can sign the certificates 130 and 140 (e.g., generate the signatures 138 and 148) via a digital signature generation algorithm using the private key 145. The relying party device, which includes a classical computer, can use the public key 144 to verify the signatures 138 and 148.

In some arrangements, each of the certificates described herein, including the certificates 110, 120, 130, and 140, can be a single-key certificate or a dual-key certificate. A single-key certificate includes one public key and one signature. A dual-key certificate includes both a native subject public key and an alternate subject public key (e.g., two public keys) and both a native certificate signature and an alternate certificate signature (e.g., two signatures). In some examples, the alternate subject public key and the alternate certificate signature can be included in an extension (e.g., the v3 extension) of the certificate. Examples of the dual-key certificate are described in X.509:2019. Accordingly, the public keys 114, 124, 134, and 144 can refer to any one of at least one public key included in a respective certificate, and the signatures 118, 128, 138, and 148 can refer to any one of at least one signature in a respective certificate.

Figure 2:
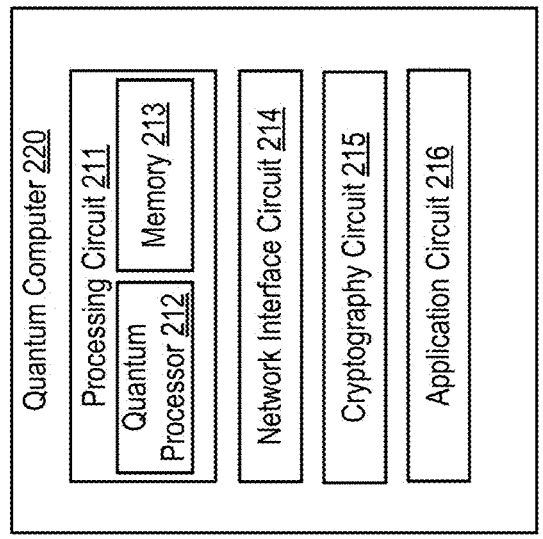
FIG. 2 illustrates block diagrams of a classical computer and a quantum computer, according to various arrangements.
Figure 2:
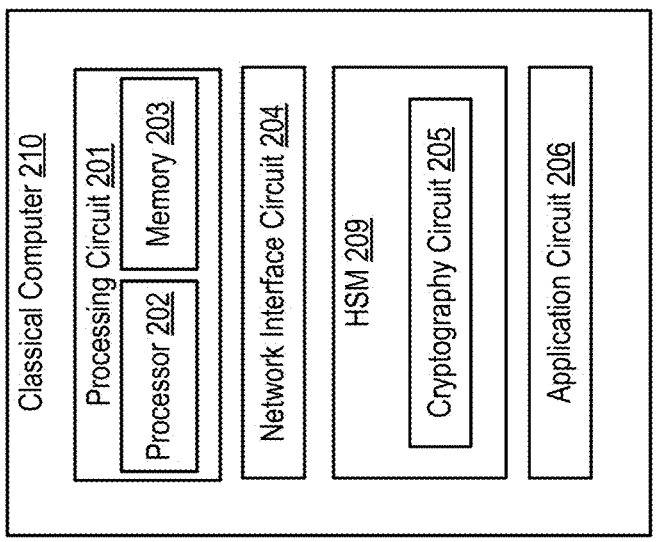

FIG. 2 illustrates block diagrams of a classical computer 210 and a quantum computer 220, according to various arrangements. In some examples, one or more of the end entity device, the HSM that stores the private key 115 of the end entity device, the system on which the cryptographic software module storing the private key 115 is running, or the relying party device includes the classical computer 210. In other words, the computing device that stores or uses the private key 115 includes the classical computer 210. Only the quantum computer 220 and not a classical computer 210 can sign the certificates 110, 120, 130, and 140 (e.g., generate the signatures 118, 128, 138, and 148) using at least one digital signature generation algorithm that can only be run on the quantum computer 220. In some examples, a same or identical quantum computer 220 signs the certificates 110, 120, 130, and 140. In some examples, each of the certificates 110, 120, 130, and 140 is signed by a respective one of multiple quantum computers 220.

The classical computer 210 includes a processing circuit 201, a network interface circuit 204, an HSM 209, a cryptography circuit 205, and an application circuit 206. The quantum computer 220 include a processing circuit 211, a network interface circuit 214, a cryptography circuit 215, and an application circuit 216. While various circuits, interfaces, and logic with particular functionality are shown, it should be understood that each of the classical computer 210 or the quantum computer 220 can include any number of circuits, interfaces, and logic for facilitating the functions described herein. For example, the activities of multiple circuits may be combined as a single circuit and implemented on a same processing circuit (e.g., processing circuit 201 and 211), as additional circuits with additional functionality are included.

In some arrangements, the classical computer 210 can be any number of different types of classical electronic computing devices, including for example, a personal computer, a laptop computer, a desktop computer, a mobile computer, a tablet computer, a smart phone, an application server, a catalog server, a communications server, a computing server, a database server, a file server, a game server, a mail server, a media server, a proxy server, a virtual server, a web server, or any other type and form of computing device or combinations of devices.

The processing circuit 201 includes at least one processor 102 and at least one memory 103. A processor 102 may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In some arrangements, the processor 102 may be a multi-core processor or an array (e.g., one or more) of processors. The processor 102 may be configured to perform classical computations on a bit, which is a binary unit of information equating to one of two possible values (e.g., a '0' or a '1').

The memory 103 (e.g., Random Access Memory (RAM), Read-Only Memory (ROM), Non-volatile RAM (NVRAM), flash memory, hard disk storage, optical media, etc.) of processing circuit 201 stores data and/or computer instructions/code for facilitating at least some of the various processes described herein. The memory 103 includes tangible, non-transient volatile memory, or non-volatile memory. The memory 103 stores programming logic (e.g., instructions/code) that, when executed by the processor 102, controls the operations of the classical computer 210. In some arrangements, the processor 102 and the memory 103 form various processing circuits described with respect to the classical computer 210. The instructions include code from any suitable computer programming language such as, but not limited to, C, C++, C#, Java, JavaScript, VBScript, Perl, HTML, XML, Python, TCL, and Basic.

The classical computer 210 includes a network interface circuit 204 configured to establish a communication session with another device for sending and receiving data over a network. Accordingly, the network interface circuit 204 includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the classical computer 210 includes a plurality of network interface circuits 204 of different types, allowing for connections to a variety of networks, such as local area networks or wide area networks including the Internet, via different sub-networks. In some examples, the network interface circuit 204 can facilitate the classical computer 210 to send the signed data, receive the signed data, or obtain (e.g., access or download) one or more of the certificates 110, 120, 130, or 140.

The classical computer 210 includes a cryptographic circuit 205 that is configured to perform cryptographic operations of the classical computer 210. The cryptographic circuit 205 can be considered as a cryptographic software module implemented using one or more of software, firmware, and hardware. In some examples, the cryptography circuit 205 can be included in or embodiment as an HSM 209. For example, the HSM 209 meets Federal Information Processing Standard (FIPS) 140-3 security level 3 or higher. For example, the cryptographic circuit 205 can perform cryptographic operations such as encrypting data, decrypting data, encrypting another cryptographic material (e.g., another cryptographic key), decrypting another cryptographic material, signing data, verifying data, signcrypting data, and so on. For example, the cryptographic circuit 205 of the end entity device can be configured to sign data using the private key 115. For example, the cryptographic circuit 205 of the end entity device can be configured to sign data using the private key 115. For example, the cryptographic circuit 205 of the relying party device can be configured to verify the signature on the sign data using the public key 114 and to verify the signatures 118, 128, 138, and 148 using respective ones of the public keys 124, 134, and 144.

The application circuit 206 executes an application, software, firmware, or code for which cryptographic operations are needed to encrypt data, decrypt data, encrypt another cryptographic material, decrypt another cryptographic material, sign data, verify data, signcrypt data, and so on. For example, the application circuit 206 can execute a mobile banking application, a browser, a word processing application, a mobile banking application, a mobile wallet, a Graphic User Interface (GUI), an email reader/client, a File Transfer Protocol (FTP) client, a virtual machine application and so on. For example, application circuit 206 can execute an application, software, firmware, or code for which data (e.g., message, code, document, file, program or application, etc.) needs to be signed or for which a signature on the signed data needs to be verified.

The quantum computer 220 is a quantum computing device can be any number of different types of quantum computing device, including for example, a superconducting quantum computer, a trapped ion quantum computer, an optical lattice based quantum computer, a quantum dot computer (spin-based or spatial-based), coupled quantum wire, a Nuclear Magnetic Resonance Quantum Computer (NMRQC), a Solid-State Nuclear Magnetic Resonance (NMR) Kane quantum computer, an electrons-on-helium quantum computer, a Cavity Quantum Electrodynamics (CQED) based quantum computer, a molecular magnet-based quantum computer, a fullerene-based Electronic Spin Resonance (ESR) quantum computer, a linear optical quantum computer, a diamond-based quantum computer, a Bose-Einstein condensate-based quantum computer, a transistor-based quantum computer, a rare-earth-metal-ion-doped inorganic crystal based quantum computer, a metallic-like carbon nanospheres based quantum computers, or any other type and form of quantum computing device or combinations of devices.

In some examples, the quantum computer 220 can be a simulated quantum computer executing an application that simulates one or more quantum computing operations capable of being performed by a quantum computing device. In some arrangements, a simulated quantum computer processes information and/or performs operations at a rate that is slower than the rate at which a quantum computer performs the same or similar operations due to the differences in performance between conventional processors configured to process logical bits and quantum logic gates configured to process quantum bits or qubits.

The processing circuit 211 of the quantum computer 220 includes at least one quantum processor 212 and at least one memory 213. The quantum processor 212 can be implemented as one or more quantum logic gates or any other suitable electronic processing component configured to perform quantum computations using quantum bits or qubits. The quantum processor 212 solves mathematical problems (e.g., integer factorization and discrete logarithms) by performing one or more quantum algorithms including algorithms based on quantum Fourier transform (e.g., Deutsch-Jozsa algorithm, Bernstein-Vazirani algorithm, Simon's algorithm, Quantum phase estimation algorithm, Shor's algorithm, Hidden subgroup problem, Boson sampling problem, Estimating Gauss sums, Fourier fishing and Fourier checking), algorithms based on amplitude amplification (e.g., Grover's algorithm, Quantum counting), algorithms based on quantum walks (e.g., element distinctness problem, triangle-finding problem, formula evaluation, group commutativity), and hybrid quantum/classical algorithms (e.g., Quantum Approximate Optimization Algorithm (QAOA), variational quantum Eigensolver, and so on).

The memory 213 of processing circuit 211 stores data and/or computer instructions/code for facilitating at least some of the various processes described herein. The memory 213 is configured to maintain a sequence of qubits representing a one, a zero, or any quantum superposition of those two qubit states. In general, a memory 213 configured to maintain n qubits can be in any superposition of up to $2^n$ different states. For example, a pair of qubits can be in any quantum superposition of 4 states and three qubits in any superposition of 8 states. Conversely, a classical computer (e.g., the classical computer 210), may only be in one of these $2^n$ states at any one time.

The network interface circuit 214 configured to establish a communication session with another device for sending and receiving data over a network. Accordingly, the network interface circuit 214 includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the quantum computer 220 includes a plurality of network interface circuits 214 of different types, allowing for connections to a variety of networks, such as local area networks or wide area networks including the Internet, via different sub-networks.

The quantum computer 220 includes a cryptographic circuit 215 that is configured to perform cryptographic operations of the quantum computer 220. For example, the cryptographic circuit 215 can such as encrypting data, decrypting data, encrypting cryptographic material (e.g., a cryptographic key), decrypting another cryptographic material, signing data, verifying data, signcrypting data, and so on using a cryptographic material. For example, the cryptographic circuit 215 can be configured to sign, using a digital signature generation algorithm, at least one of the certificates 110, 120, 130, and 140. For example, the cryptographic circuit 215 can be configured to generate at least one of the signatures 118, 128, 138, and 148 using one or more digital signature generation algorithms on the respective one of at least one of the certificates 110, 120, 130, and 140.

The application circuit 216 executes an application, software, firmware, or code that allows or triggers the generation of the at least one of the signatures 118, 128, 138, and 148 using one or more digital signature generation algorithms on the respective one of at least one of the certificates 110, 120, 130, and 140. For example, the quantum computer 220 (e.g., the application circuit 216) can be operated by or working for one or more CAs that maintain at least one of the certificates 110, 120, 130, and 140 in order to provide mechanisms for verifying or validating the certificates 110, 120, 130, and 140 via the signatures 118, 128, 138, and 148 that can only be generated using the quantum computer 220.

A network can be used to send, receive, or exchange data such as the signed data and the certificates 110, 120, 130, and 140. For example, the network can include the Internet, a Radio Frequency (RF) network, a cellular network, a satellite link, a quantum network, an optical network, a laser network, a physical network or connection, and so on. The message can be transmitted via the Internet, RF, and cellular networks, RF signals, cellular signals, satellite signals, quantum bits or qubits, fiber optic signals, laser signals, and so on. The network can include any suitable Local Area Network (LAN), Wide Area Network (WAN), or a combination thereof. For example, the network can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

Although not illustrated, in many arrangements, the network can include one or more intermediary devices, including gateways, routers, firewalls, switches, network accelerators, Wi-Fi access points or hotspots, or other devices. Any of the electronic devices and/or the network may be configured to support any application layer protocol, including without limitation, Transport Layer Security (TLS), Hypertext Transfer Protocol (HTTP), and Hypertext Transfer Protocol Secure (HTTPS).

Accordingly, the operations of signing the certificates of a PKI and validating those certificates can be performed using a combination of one or more classical computers 210 and one or more quantum computers 220. For example, PKI certificates are signed using a digital signature algorithm that can only run signature generation on one or more quantum computers 220. Asymmetric private keys are used with a digital signature algorithm that can only run signature generation on one or more quantum computers 220. In some arrangements, classical computers 210 (e.g., the relying party device) can be used to verify the certificates 110, 120, 130 and 140 using the public keys 114, 124, 134, and 144 to allow ubiquitous deployment given that classical computers 210 are inexpensive and widespread technology, while quantum computers 220 are used to generate the signatures 118, 128, 138, and 148 to improve security of certificate chain validation given that quantum computers 220 and the signature generation algorithms running thereon are expensive and scarce combination of hardware and software that would pose significant barrier to attackers to replicate the signature generation algorithms. Accordingly, the arrangements disclosed herein relate can balance pervasive deployment of the certificate chain validation scheme with improved security using a combination of classical computers 210 and quantum computers 220.

In some arrangements, the quantum computer 220 run any digital signature generation algorithm having operations that are calculated or processed, wholly or at least partially, using quantum bits or qubits. The National Institute of Standards and Technology (NIST) selects public-key cryptographic algorithms through a public competition-like process, referred to as NIST Post-Quantum Cryptography (PQC) Standardization Process. The new public-key cryptography standards specify one or more additional algorithms in each of digital signature, public-key encryption, and key-establishment. The new standards augment Federal Information Processing Standard Publication (FIPS) 186-4, Digital Signature Standard (DSS), as well as Special Publications 800-56A Revision 3, Recommendation for Pair-Wise Key Establishment Schemes Using Discrete Logarithm Cryptography, and 800-56B, Recommendation for Pair-Wise Key-Establishment Schemes Using Integer Factorization. The digital signature algorithm that runs signature verification on a quantum computer 220 includes any digital signature algorithm designated in the PQC standard. In some examples, the digital signature algorithm that runs signature verification on a quantum computer 220 includes any QC-resistant cryptographic algorithms.

In some examples, the digital signature algorithm that runs signature generation on a quantum computer 220 includes any suitable digital signature algorithm described in U.S. patent application Ser. No. 16/546,988, titled "QUANTUM AND CLASSICAL CRYPTOGRAPHY (QCC) FOR DATA SIGNING AND DATA VERIFICATION," filed Aug. 21, 2019, the entire content of which is incorporate by reference in their entirety. For example, the cryptography circuit 215 can be configured to generate a signature using a digital signature algorithm based on an equation or a function. For example, the cryptography circuit 215 can be configured to compute (e.g., calculate, determine, etc.) a coefficient associated with or used in any suitable digital signature algorithm that generates a digital signature for a certificate. The cryptography circuit 215 can generate, based on the coefficient, an equation relating a plurality of parameter values to a plurality of digital signatures. The cryptography circuit 215 can randomly select, using the equation, a parameter value from the plurality of parameter values. The cryptography circuit 215 can further be configured to compute, using the equation, a digital signature corresponding to the selected parameter value.

A quantum algorithm (e.g., Shor's algorithm, etc.) allows a quantum computer 220 or a simulated quantum computer to factor numbers. This quantum computer capability can be used for signature generation on a quantum computer 220 or a simulated quantum, while signature verification may be performed on a classical computer 210. For example, data D that is not a prime number can be factored by a quantum computer 220 into its unique product of prime numbers.

Quantum computers are adapt at solving complex linear equations quickly whereas to perform the same calculations, classical computers require impractical time (e.g., nonpolynomial time), infeasible amounts of memory, and extraordinary huge storage capacities. Thus, classical computers can only determine approximations of complex linear equations. While a classical computer processes bits sequentially, the quantum bits or qubits processed by a quantum computer are entangled together. Changing the state of one qubit influences the state of others regardless of their physical distance. Furthermore, the superposition principle of quantum mechanics allows a qubit to simultaneously store more information than the classical deterministic "0" and "1". That is, two qubits can simultaneously hold four probabilistic (22) values (e.g., 00, 01, 10, and 11). Thus, a "true" quantum computer that is able to implement both the entanglement and superposition principles can converge on the right answer to a difficult mathematical problem very quickly. The advent of quantum computers with cryptanalytic capabilities to solve these "difficult" mathematical problems threatens many of these asymmetric algorithms. A quantum computer can rapidly solve integer factorization and discrete logarithmic problems to reveal the private key by using a quantum computer algorithm, such as Shor's algorithm. The cryptography circuit 215 can generate a signature (e.g., the signatures 118, 128, 138, and 148) using a digital signature algorithm based on an equation or a function, which can be obtained based on one or more coefficients.

In some examples, the cryptographic circuit 215 can perform reversible polynomial series (e.g., a reversible Taylor series expansion) as described in U.S. patent application Ser. No. 18/234,257, titled "QUANTUM COMPUTING-BASED REVERSIBLE POLYNOMIAL SERIES FOR CRYPTOGRAPHIC OPERATIONS," filed Aug. 15, 2023, the entire content of which is incorporate by reference in their entirety. In some examples, a cryptographic material as used herein refers to any tangible information that can be used in cryptographic operations (e.g., cryptographic processes or cryptographic algorithms) to encrypt, decrypt, validate, authenticate, or protect sensitive information. Examples of the cryptographic material include a cryptographic key (e.g., private keys 115, 125, 135, and 145, a secret key, and so on), information (e.g., a secret parameter, a random number, a key component, an initialization vector) used to generate or derive a cryptographic key, authentication code, and so on. The cryptographic material can be expressed using an alphanumeric string, a binary string, and so on. A Taylor series can be used to approximate an analytical function that uses the cryptographic material. Examples of the analytical function includes trigonometric functions, exponents, and so on. In some examples, a Taylor series can be used to approximate an encryption function, a cryptographic signature function, a mathematical calculation (e.g., XOR), an analytic function and so on. For example Hash-based Message Authentication Code (HMAC) uses a hash function with a cryptographic material (e.g., a symmetric key parameter) to generate a Message Authentication Code (MAC) output.

The cryptographic circuit 215 can receive from a classical computer or a quantum computer via the network the coefficient information. The cryptographic circuit 215 can determine the function using the coefficient information. First, the cryptographic circuit 215 determines the polynomial series using the coefficient information. The coefficient information can be parsed to obtain the coefficients of the polynomial series. Given that the polynomial series (e.g., the Taylor series) has a known structure such as:

$$f(x) = \sum \frac{f^{(n)}(a)}{n!}(x-a)^n, \quad (1)$$

the cryptographic circuit 215 can plug in the coefficients into the known structure to obtain the polynomial series.

The cryptographic circuit 215 can determine the function using the polynomial series, using a graph similarity algorithm and an optimization algorithm. In some arrangements, a quantum computer 220 can perform a graph similarity algorithm using the polynomial series as input to generate a graph kernel. The graph kernel is a measure of how similar two graphs are to each other. The smaller the kernel, the more similar the graphs. The graph similarity algorithm is a quantum algorithm used to measure the similarities between two graphs, one of which is the graph of the polynomial series, and another one of which is a graph of a function. Two graphs are first merged using connections between nodes of the two graphs. The merged structure is analyzed using continuous-time quantum walks and quantum Jensen-Shannon divergence. An example of the graph similarity algorithm is described in Rossi et al., "Measuring Graph Similarity Through Continuous-Time Quantum Walks and The Quantum Jensen-Shannon Divergence," Phys. Rev. E 91, 022815 (Feb. 23, 2015).

To recreate a function, the graph kernel is minimized by estimating or guessing the most optimal matching graph. This reduces the problem to the Traveling Salesman Problem (TSP) in combinatorial optimization, which can be efficiently solved on quantum computers by using the phase estimation algorithm. An example of resolving the TSP problem using phase estimation algorithm is described in Srinivasan, et al., "Efficient Quantum Algorithm for Solving Travelling Salesman Problem: An IBM Quantum Experience," arXiv preprint arXiv: 1805.10928 (2018). Accordingly, the phase estimation algorithm can be applied to optimize the minimization of the graph kernel.

For example, the cryptographic circuit 215 provides an arbitrary guess by selecting one function of a plurality of known functions. The cryptographic circuit 215 calculates the initial kernel $k_0$ between the polynomial series and the selected function using graph similarity algorithm. The cryptographic circuit 215 then minimizes the initial kernel $k_0$ using an optimization algorithm (e.g., phase estimation algorithm) for combinatorial optimization. The possible combination of functions are the combinatorial in the optimization algorithm. The function of the plurality of known functions that yields the lowest kernel is selected to be the function corresponding to the coefficient information.

The cryptographic circuit 215 can determine the cryptographic material using or for the function. In some arrangements, the cryptographic material can be mapped to or associated with the function. For example, the cryptographic material can be a type of cryptographic material that is used in the function (e.g., the analytic function such as trigonometric functions, exponents, and so on). Based on predefine mapping, a cryptographic material or a type of cryptographic materials corresponding to the function can be determined. In some examples, the determined function can be executed or performed to calculate by the cryptographic circuit 215 to generate the cryptographic material or a component thereof, which is used to derive the cryptographic material. For example, the cryptographic circuit 215 can plug in at least one parameters (e.g., a seed, a salt, a secret parameter, a random number, and so on) into the function to generate the cryptographic material.

The cryptographic circuit 215 performs a cryptographic operation using the cryptographic material and the analytic function. For example, the cryptographic circuit 215 can generate the signature 118, 128, 138, and 148 using the private keys 115, 125, 135, and 145, respectively.

FIG. 3 is a schematic diagram illustrating an example method 300 for PKIQC certificate chain validation, according to various arrangements. The method 100 is a particular implementation of some aspects of the method 300. The method 300 can be performed using the classical computer 210, whereas the PKIQC certificate chain is created or managed (according to the method 400) by the quantum computer 220. The classical computer 210 includes at least one processor that processes bits.

In some examples, the classical computer 210 performs certificate chain validation including validating a plurality of certificates 110, 120, 130, and 140. Performing the certificate chain validation includes 310 and 320. While the certificates 110, 120, 130, and 140 are shown as examples of certificates in a certificate chain, a certificate chain can include any number of two or more certificates. For example, a certificate chain can include a subject certificate, an ICA certificate, and an RCA certificate, where the public key included in the RCA certificate can be used to validate the signature in the ICA certificate, and the public key included in the ICA certificate can be used to validate the signature in the subject certificate. For example, a certificate chain can include a subject certificate, an ICA certificate, an SCA certificate, and an RCA certificate as shown in FIG. 1, where the public key included in the RCA certificate can be used to validate the signature in the SCA certificate, the public key included in the SCA certificate can be used to validate the signature in the ICA certificate, and the public key included in the ICA certificate can be used to validate the signature in the subject certificate. For example, a certificate chain can include a subject certificate, an ICA certificate, multiple SCA certificate, and an RCA certificate, where the public key included in the RCA certificate can be used to validate the signature in a first SCA certificate, the public key included in the first SCA certificate can be used to validate the signature in a next SCA certificate, and so on, the public key included in the last SCA certificate can be used to validate the signature in the ICA certificate, and the public key included in the ICA certificate can be used to validate the signature in the subject certificate. The signatures are generated by at least one quantum computers for each of the certificates in the certificate chain in the manner described.

At 310, the classical computer 210 (e.g., at least one processor thereof, such as the cryptography circuit 205) validates a first signature on a first certificate (e.g., any of the certificates 120, 130, and 140) of the plurality of certificates using a first public key. The first signature is generated for the first certificate by a first quantum computer using a first digital signature generation algorithm based on a first private key. The first public key and the first private key form a first public/private key pair. The first signature can be at least one signature (e.g., one or more of the native certificate signature or alternate certificate signature) included in the first certificate. The first public key can be at least one public key (e.g., one or more of the native subject public key or the alternate subject public key) included in a certificate. The first private key includes one or more private keys each corresponding to or forming a public/private key pair with a respective one of the at least one first public key.

At 320, the classical computer 210 (e.g., at least one processor thereof, such as the cryptography circuit 205) validates a second signature (e.g., the signature 118) on a second certificate (e.g., the subject certificate 110) of the plurality of certificates using a second public key (e.g., the public key 124 of the ICA). The second signature is generated for the second certificate by a second quantum computer using a second digital signature generation algorithm based on a second private key (e.g., the private key 115). The second public key and the second private key form a second public/private key pair. The second signature can be at least one signature (e.g., one or more of the native certificate signature or alternate certificate signature) included in the second certificate. The second public key can be at least one public key (e.g., one or more of the native subject public key or the alternate subject public key) included in a certificate. The second private key includes one or more private keys each corresponding to or forming a public/private key pair with a respective one of the at least one second public key.

At 330, in response to successfully completing the certificate chain validation, the classical computer 210 (e.g., at least one processor thereof, such as the cryptography circuit 205) uses a third public key (e.g., public key 114) in the second certificate to verify a third signature on signed data. The third signature is used to verify signed data and therefore can be referred to as a data signature. On the other hand, the first and second signatures are used for certificate verification and therefore can be referred to as certificate signatures. The first quantum computer and the second quantum computer processes quantum bits or qubits. The third public key can be at least one public key (e.g., one or more of the native subject public key or the alternate subject public key) included in the second certificate.

In some examples, the signed data is signed by an end entity device using a third private key of the end entity device. The third public key and the third private key form a third public/private key pair. The end entity device comprises a classical computer having at least one processor that processes bits. The signed data comprises a message, code, document, file, program, or application signed by the end entity using the third private key.

In some examples, the end entity device secures the third private key in a HSM or a cryptographic software module. The end entity device comprises the HSM, or the HSM is provided in another classical computer having at least one processor that processes bits. The cryptographic software module runs on the end entity device, or the cryptographic software module runs on another classical computer having at least one processor that processes bits.

In some examples, the first quantum computer and the second quantum computer are the same or identical quantum computer 220. That is, two or more of the certificates in the certificate chain are signed by the same quantum computer 220. In some examples, the first quantum computer and the second quantum computer are different. That is, two or more of the certificates in the certificate chain are signed by different quantum computers 220.

In some examples, each of the first digital signature generation algorithm and the second digital signature generation algorithm is calculated or processed, wholly or at least partially, using the quantum bits or the qubits by the first quantum computer and the second quantum computer respectively. In some examples, the at least one processor of the classical computer 210 is configured to receive the signed data and the second certificate from an end entity device or another device.

In some arrangements, the first certificate includes an ICA certificate 120 of an ICA. The first signature (e.g., the signature 128) is signed by the first quantum computer of a SCA in some examples. In some examples in which there is no SCA, the first signature (e.g., the signature 128) is signed by the first quantum computer of an RCA. In this case, the first certificate includes the second public key. That is, the ICA certificate 120 includes the public key 124 (e.g., the second public key) use to verify the signature 118 in subject certificate 110.

In some arrangements, the first certificate includes an SCA certificate 130 of an SCA. The first signature (e.g., the signature 138) is signed by the first quantum computer of an RCA in some examples. In some examples, the first signature is signed by the first quantum computer of another SCA. The first certificate includes a fourth public key (e.g., the public key 134) used by the at least one processor to validate a fourth signature (e.g., the signature 128) on a fourth certificate (e.g., the ICA certificate 120) of the plurality of certificates.

In some arrangements, the first certificate includes an RCA certificate 140 of an RCA. The first signature (e.g., the signature 148) is signed by the first quantum computer of the RCA. The first certificate includes a fourth public key (e.g., the public key 144) used by the at least one processor to validate a fourth signature (e.g., the signature 138) on a fourth certificate (e.g., the SCA certificate 130) of the plurality of certificates.

FIG. 4 is a schematic diagram illustrating an example method for managing a PKIQC certificate chain, according to various arrangements. The method 100 is a particular implementation of some aspects of the method 400. The method 400 can be performed using the quantum computer 220, whereas the PKIQC certificate chain is validated (according to the method 300) by the classical computer 210. The quantum computer 220 includes at least one processor that processes quantum bits or qubits.

At 410, the quantum computer 220 (e.g., at least one processor thereof, such as the cryptography circuit 215) generates a first signature on a first certificate (e.g., any of the certificates 120, 130, and 140) of the plurality of certificates using a first digital signature generation algorithm based on a first private key. The first signature is validated by a relying party device using a first public key in certificate chain validation. The first public key and the first private key form a first public/private key pair. The first signature can be at least one signature (e.g., one or more of the native certificate signature or alternate certificate signature) included in the first certificate. The first public key can be at least one public key (e.g., one or more of the native subject public key or the alternate subject public key) included in a certificate. The first private key includes one or more private keys each corresponding to or forming a public/private key pair with a respective one of the at least one first public key.

At 420, the quantum computer 220 (e.g., at least one processor thereof, such as the cryptography circuit 215) generates a second signature (e.g., the signature 118) on a second certificate (e.g., the subject certificate 110) of the plurality of certificates using a second digital signature generation algorithm based on a second private key (e.g., the private key 115). the second signature is validated by the relying party device using a second public key (e.g., the public key 124) in the certificate chain validation. The second public key and the second private key form a second public/private key pair. The second signature can be at least one signature (e.g., one or more of the native certificate signature or alternate certificate signature) included in the second certificate. The second public key can be at least one public key (e.g., one or more of the native subject public key or the alternate subject public key) included in a certificate. The second private key includes one or more private keys each corresponding to or forming a public/private key pair with a respective one of the at least one second public key.

In some examples, the relying party device uses a third public key (e.g., the public key 114) in the second certificate to verify a third signature on signed data. The relying party device includes a classical computer having at least one processor that processes bits. The third public key can be at least one public key (e.g., one or more of the native subject public key or the alternate subject public key) included in the second certificate.

In some examples, the signed data is signed by an end entity device using a third private key of the end entity device. The third public key and the third private key form a third public/private key pair. The end entity device includes a classical computer having at least one processor that processes bits. The signed data includes a message, code, document, file, program, or application signed by the end entity using the third private key.

In some examples, the at least one processor includes a first processor of a first quantum computer that processes the quantum bits or the qubits. The first processor generates the first signature on the first certificate using the first digital signature generation algorithm. In some examples, the at least one processor comprises a second processor of a second quantum computer that processes the quantum bits or the qubits. The second processor generates the second signature on the second certificate using the second digital signature generation algorithm.

In some examples, each of the first digital signature generation algorithm and the second digital signature generation algorithm is calculated or processed, wholly or at least partially, using the quantum bits or the qubits by the first quantum computer and the second quantum computer respectively. In some examples, the at least one processor of a same quantum computer that generates the first signature on the first certificate using the first digital signature generation algorithm and the second signature on the second certificate using the second digital signature generation algorithm.

In some arrangements, the first certificate includes an ICA certificate 120 of an ICA. The first signature (e.g., the signature 128) is signed by the first quantum computer of a SCA in some examples. In some examples in which there is no SCA, the first signature (e.g., the signature 128) is signed by the first quantum computer of an RCA. In this case, the first certificate includes the second public key. That is, the ICA certificate 120 includes the public key 124 (e.g., the second public key) use to verify the signature 118 in subject certificate 110.

In some arrangements, the first certificate includes an SCA certificate 130 of an SCA. The first signature (e.g., the signature 138) is signed by the first quantum computer of an RCA in some examples. In some examples, the first signature is signed by the first quantum computer of another SCA. The first certificate includes a fourth public key (e.g., the public key 134) used by the at least one processor to validate a fourth signature (e.g., the signature 128) on a fourth certificate (e.g., the ICA certificate 120) of the plurality of certificates.

In some arrangements, the first certificate includes an RCA certificate 140 of an RCA. The first signature (e.g., the signature 148) is signed by the first quantum computer of the RCA. The first certificate includes a fourth public key (e.g., the public key 144) used by the at least one processor to validate a fourth signature (e.g., the signature 138) on a fourth certificate (e.g., the SCA certificate 130) of the plurality of certificates.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A system, comprising:
   at least one memory; and
   at least one processor that processes bits, the at least one processor configured to:
   perform certificate chain validation comprising validating a plurality of certificates, wherein performing the certificate chain validation comprises:
   validating a first signature on a first certificate of the plurality of certificates using a first public key, wherein the first signature is generated for the first certificate by a first quantum computer using a first digital signature generation algorithm based on a first private key, and wherein the first public key and the first private key form a first public/private key pair; and
   validating a second signature on a second certificate of the plurality of certificates using a second public key, wherein the second signature is generated for the second certificate by a second quantum computer using a second digital signature generation algorithm based on a second private key, and wherein the second public key and the second private key form a second public/private key pair; and
   in response to successfully completing the certificate chain validation, use a third public key in the second certificate to verify a third signature on signed data, wherein the first quantum computer and the second quantum computer processes quantum bits, wherein
   the signed data is signed by an end entity device using a third private key of the end entity device;
   the third public key and the third private key form a third public/private key pair;
   the end entity device comprising a classical computer having at least one processor that processes bits; and
   the signed data comprises a message, code, document, file, program, or application signed by the end entity using the third private key.

2. The system of claim 1, wherein
   the end entity device secures the third private key in a Hardware Security Module (HSM) or a cryptographic software module;
   the end entity device comprises the HSM, or the HSM is provided in another classical computer having at least one processor that processes bits; and
   the cryptographic software module runs on the end entity device, or the cryptographic software module runs on another classical computer having at least one processor that processes bits.

3. The system of claim 1, wherein the first quantum computer and the second quantum computer are identical.

4. The system of claim 1, wherein the first quantum computer and the second quantum computer are different.

5. The system of claim 1, wherein each of the first digital signature generation algorithm and the second digital signature generation algorithm is calculated or processed, wholly or at least partially, using the quantum bits by the first quantum computer and the second quantum computer respectively.

6. The system of claim 1, where the at least one processor is configured to receive the signed data and the second certificate from an end entity device or another device.

7. The system of claim 1, wherein
   the first certificate comprises an Issuing Certificate Authority (ICA) certificate of an ICA;
   the first signature is signed by the first quantum computer of a Subordinary Certificate Authority (SCA) or a Root Certificate Authority (RCA); and
   the first certificate comprises the second public key.

8. The system of claim 1, wherein
   the first certificate comprises an Subordinary Certificate Authority (SCA) certificate of an SCA;
   the first signature is signed by the first quantum computer of a Root Certificate Authority (RCA) or another SCA; and
   the first certificate comprises a fourth public key used by the at least one processor to validate a fourth signature on a fourth certificate of the plurality of certificates.

9. The system of claim 1, wherein
   the first certificate comprises a Root Certificate Authority (RCA) certificate of an RCA;
   the first signature is signed by the first quantum computer of the RCA; and
   the first certificate comprises a fourth public key used by the at least one processor to validate a fourth signature on a fourth certificate of the plurality of certificates.

10. A system, comprising:
    at least one memory; and
    at least one processor that processes quantum bits, the at least one processor configured to:
    generate a first signature on a first certificate of the plurality of certificates by a first quantum computer using a first digital signature generation algorithm based on a first private key, wherein the first signature is validated by a relying party device using a first public key in certificate chain validation, and wherein the first public key and the first private key form a first public/private key pair; and
    generate a second signature on a second certificate of the plurality of certificates by a second quantum computer using a second digital signature generation algorithm based on a second private key, wherein the second signature is validated by the relying party device using a second public key in the certificate chain validation, and wherein the second public key and the second private key form a second public/private key pair, wherein
       the relying party device uses a third public key in the second certificate to verify a third signature on signed data, and wherein the relying party device comprises a classical computer having at least one processor that processes bits, wherein
    the signed data is signed by an end entity device using a third private key of the end entity device;
    the third public key and the third private key form a third public/private key pair;
    the end entity device comprising a classical computer having at least one processor that processes bits; and
    the signed data comprises a message, code, document, file, program, or application signed by the end entity using the third private key.

11. The system of claim 10, wherein
    the at least one processor comprises a first processor of the first quantum computer that processes the quantum bits, wherein the first processor generates the first signature on the first certificate using the first digital signature generation algorithm; and
    the at least one processor comprises a second processor of the second quantum computer that processes the quantum bits, wherein the second processor generates the second signature on the second certificate using the second digital signature generation algorithm.

12. The system of claim 11, wherein each of the first digital signature generation algorithm and the second digital signature generation algorithm is calculated or processed, wholly or at least partially, using the quantum bits by the first quantum computer and the second quantum computer respectively.

13. The system of claim 10, wherein the at least one processor of a same quantum computer generates the first signature on the first certificate using the first digital signature generation algorithm and the second signature on the second certificate using the second digital signature generation algorithm.

14. The system of claim 10, wherein
the first certificate comprises an Issuing Certificate Authority (ICA) certificate of an ICA;
the first signature is signed by the at least one processor of a Subordinary Certificate Authority (SCA) or a Root Certificate Authority (RCA); and
the first certificate comprises the second public key.

15. The system of claim 10, wherein
the first certificate comprises an Subordinary Certificate Authority (SCA) certificate of an SCA;
the first signature is signed by the at least one processor of a Root Certificate Authority (RCA) or another SCA; and
the first certificate comprises a fourth public key used by the at least one processor to validate a fourth signature on a fourth certificate of the plurality of certificates.

16. The system of claim 10, wherein
the first certificate comprises a Root Certificate Authority (RCA) certificate of an RCA;
the first signature is signed by the at least one processor of the RCA; and
the first certificate comprises a fourth public key used by the at least one processor to validate a fourth signature on a fourth certificate of the plurality of certificates.

17. At least one non-transitory computer-readable medium comprising computer-readable instructions, that, when executed, causes at least one processor that processes quantum bits to:
generate a first signature on a first certificate of the plurality of certificates by a first quantum computer using a first digital signature generation algorithm based on a first private key, wherein the first signature is validated by a relying party device using a first public key in certificate chain validation, and wherein the first public key and the first private key form a first public/private key pair; and
generate a second signature on a second certificate of the plurality of certificates by a second quantum computer using a second digital signature generation algorithm based on a second private key, wherein the second signature is validated by the relying party device using a second public key in the certificate chain validation, and wherein the second public key and the second private key form a second public/private key pair, wherein
the relying party device uses a third public key in the second certificate to verify a third signature on signed data, and wherein the relying party device comprises a classical computer having at least one processor that processes bits, wherein
the signed data is signed by an end entity device using a third private key of the end entity device;
the third public key and the third private key form a third public/private key pair;
the end entity device comprising a classical computer having at least one processor that processes bits; and
the signed data comprises a message, code, document, file, program, or application signed by the end entity using the third private key.

* * * * *